(12) United States Patent
Ospina

(10) Patent No.: US 8,298,422 B2
(45) Date of Patent: Oct. 30, 2012

(54) METHOD AND PLANT FOR THE TREATMENT OF EFFLUENTS CONTAINING NITROGEN IN A SEQUENCING BATCH REACTOR

(75) Inventor: Adriana Gonzalez Ospina, Le Pecq (FR)

(73) Assignee: Degremont, Paris la Defense (FR)

( * ) Notice: Subject to any disclaimer, the term of this patent is extended or adjusted under 35 U.S.C. 154(b) by 62 days.

(21) Appl. No.: 12/681,947

(22) PCT Filed: Oct. 6, 2008

(86) PCT No.: PCT/FR2008/001394
§ 371 (c)(1),
(2), (4) Date: Aug. 6, 2010

(87) PCT Pub. No.: WO2009/080912
PCT Pub. Date: Jul. 2, 2009

(65) Prior Publication Data
US 2010/0303695 A1 Dec. 2, 2010

(30) Foreign Application Priority Data
Oct. 9, 2007 (FR) ..................... 07 07080

(51) Int. Cl.
*C02F 3/00* (2006.01)
*C02F 3/30* (2006.01)
(52) U.S. Cl. ........ 210/601; 210/630; 210/739; 210/749; 210/903; 422/105
(58) Field of Classification Search .............. 210/601, 210/630, 739, 749, 903; 422/105, 129
See application file for complete search history.

(56) References Cited

U.S. PATENT DOCUMENTS
2002/0117445 A1 8/2002 Whiteman
2010/0243565 A1* 9/2010 Isaka et al. .................. 210/614

FOREIGN PATENT DOCUMENTS
DE 19827877 A1 1/2000
WO WO-9834878 A1 8/1998
WO WO 2007-014994 A1 * 2/2007

* cited by examiner

*Primary Examiner* — Timothy Vanoy
(74) *Attorney, Agent, or Firm* — Connolly Bove Lodge & Hutz LLP

(57) ABSTRACT

A method for the treatment of effluents containing nitrogen in the form of ammonium, in which: a volume of effluent is introduced into the batch reactor in successive volume fractions, each volume fraction being treated during a subcycle, each subcycle including a phase of feeding with a volume fraction and, in an alternating manner, two treatment stages, i.e. an aerated first stage, during which complete or partial oxidation of the ammonium takes place to give nitrites, followed by a nonaerated second stage, during which the nitrites produced and the ammonium are converted to nitrogen gas. During the aerated first stage, the dissolved oxygen concentration in the batch reactor is maintained between 0.1 $mgO_2/l$ and 0.6 $mgO_2/l$; the $N-NO_2:N-NH_4$ ratio is adjusted to be between 0.9 and 1.5 at the beginning of the nonaerated stage; and the nonaerated phase is carried out by deammonification, without the provision of carbon-based substrate.

19 Claims, 5 Drawing Sheets

METHOD AND PLANT FOR THE TREATMENT OF EFFLUENTS CONTAINING NITROGEN IN A SEQUENCING BATCH REACTOR

The invention relates to a method for the treatment of effluents containing nitrogen in the form of ammonium, using a sequencing batch reactor, said method comprising:
- an aerated first stage, during which complete or partial oxidation of the ammonium so as to give nitrites takes place,
- followed by a nonaerated second stage, during which the nitrites produced and the ammonium are converted to nitrogen gas, according to which method a bacterial selection pressure favorable to the development and to the activity of nitriting bacteria is exerted in order to carry out the two treatment stages in the same reactor and in an alternating manner, and is produced by ammoniacal peaks or single-shots through the successive introduction of known volume fractions of the effluent to be treated into the batch reactor,
a volume of effluent to be treated in a complete cycle being introduced into the reactor in successive volume fractions, the complete treatment cycle being divided up into successive subcycles, each subcycle comprising a phase of feeding with a volume fraction, and then a phase of aeration so as to bring about the nitritation, and then an anoxic phase during which the aeration is stopped.

A method of the type defined above is known according to patent application FR 2 889 180 A1. The method covered by this document makes it possible to convert the ammonium virtually exclusively to nitrites during an aerated oxidative first phase, before conversion to nitrogen gas during a second, anoxic denitrification phase. However, the second phase corresponds to a heterotrophic reduction of the nitrites to nitrogen gas and requires the provision of a readily biodegradable carbon-based substrate, generally introduced in the form of methanol or ethanol, resulting in running costs that it is desirable to reduce.

The invention relates more particularly to the treatment of water of municipal, industrial or food-processing origin, or of aqueous waste originating from the dehydration of digested sludge, from the treatment of sludge by wet oxidation, sludge drying condensates, leachates from landfills, liquid manures, or any installation having to treat water containing ammonium, irrespective of its concentration and its temperature.

The lack of quality control with respect to waste water derived from human, agricultural or industrial activity can, in the short or long term, have a major detrimental impact on the health and on the environment. In order to preserve the natural environment, more strict regulations are imposed in order to limit mainly nitrogen and phosphorous waste.

In purification stations, the carbon-based pollution and nitrogen-based pollution of waste water are mainly eliminated biologically. This conventional pathway is based on the ability of microorganisms to eliminate the pollution by assimilation and by biodegradation, according to various processes summarized hereinafter.

1/Conventional Nitrification

In the case of nitrogen, a distinction is made essentially between nitrification and denitrification treatments. During nitrification, the ammonium is oxidized under aerated conditions by autotrophic bacteria according to two stages: first so as to give nitrites, by "ammonium-oxidizing" bacteria (AOB), and then so as to give nitrates, by "nitrite-oxidizing" bacteria (NOB). During denitrification, the nitrates produced are finally reduced to nitrogen gas under anoxic conditions by a pool of heterotrophic bacteria, requiring readily biodegradable carbon.

The major constraint associated with the conventional treatment of nitrogen by nitrification and denitrification is caused in particular by:
- the high oxygen needs for oxidation of the ammonium to nitrates (4.57 $mgO_2/mgN$),
- the need for large reaction volumes in order to maintain a high sludge age and to allow the development of the slow-growing nitrifying microorganisms,
- the absence or the limitation of biodegradable carbon available for denitrification, which makes it necessary to use an external source of carbon-based reagent with high needs (2.86 mgC/mgN).

The high cost of this conventional treatment is in particular disadvantageous when the effluents to be treated are characterized by low COD/N typological ratios (COD=chemical oxygen demand; N=nitrogen).

2/Partial Nitrification or Nitration=Nitrate Shunt

In order to minimize the impact of the conventional biological treatment, partial nitrification and heterotrophic denitrification starting from nitrites has been proposed and described in EP 0 826 639 A1 and FR 2 889 180 A1, already mentioned. This treatment, also called nitrate shunt, makes it possible to convert the ammonium to nitrites during an aerated oxidative first phase, and then to go directly to nitrogen gas during a second, anoxic denitrification phase. The nitrite accumulation is obtained by maintaining the operating conditions such as low dissolved oxygen concentrations, the pH, a high temperature and high concentrations of ammonium. This is why this type of treatment was initially proposed for concentrated effluents of digestion centrate type.

Compared with the conventional biological treatment previously described, approximately 25% of the aeration energy, 40% of the biodegradable carbon needs and 25% of the sludge production can be saved with this type of treatment.

The mechanisms described in EP 0 826 639 A1 lead to specific leaching of the biomass responsible for the oxidation of the nitrites to nitrates (NOB) through the use of a chemostat reactor without biomass retention (output flow rate equal to input flow rate) in which the sludge age is set by the hydraulic residence time. The leaching is partly physical, through evacuation of the biomass, and partly due to inactivation of the bacteria owing to the operating parameters.

In contrast to this system, FR 2 889 180 A1 has shown the advantage of using sequencing batch reactors for partial nitrification by introducing specific treatment sequences with a limited duration, which make it possible to exert, in a stabilized manner, by means of ammoniacal peaks or single-shots, a selection pressure favorable to the development of the biomass responsible for the oxidation of ammonium to nitrites (AOB), and to treat greater loads by virtue of the retention of biomass in the sequencing batch reactor.

In the two cases, the heterotrophic reduction of nitrites to nitrogen gas requires the provision of a readily biodegradable carbon-based substrate in order for it to take place.

3/Nitritation and Anammox Reaction=Deammonification

In order to substantially limit the use of exogenous carbon-based substrates, or even reduce them completely, it is also possible to carry out the nitrogen treatment by means of an entirely autotrophic reaction in which the oxidation of the ammonium takes place using the nitrites as electron acceptors under conditions of strict anoxia.

In this solution, also called "deammonification", it is necessary to first oxidize a part of the ammonium to nitrites (by nitritation), and then to cause the deammonification reaction using the remaining ammonium and the nitrites produced, so as to form nitrogen gas ($N_2$). The sensitive point of this reaction is the maintaining of a stabilized nitrite/ammonium ratio during the first treatment stage. The gains compared with the conventional biological treatment of nitrogen are associated with savings in terms of the aeration energy needs, which are reduced by 60%, and with the fact that there is no longer any need for readily biodegradable carbon for the denitrification.

Several implementations have been proposed for this application using one or two reactors (WO 00 5176 and EP 0 931 023 B1). When two reactors are used to carry out the treatment, the nitritation stage is commonly carried out in a chemostat reactor without biomass retention, with, as principal limit, the stability of the nitrite production, which cannot be readily guaranteed since it depends greatly in this system on the bicarbonate concentration of the effluent. Furthermore, the maximum admissible loads with this method are limited by a hydraulic residence time of 1 to 2 days.

Given the slow growth rates of anammox bacteria, the deammonification reaction is carried out in fluidized biofilm reactors or in sequencing batch reactors in which biomass retention is favored.

WO 2007/033393 A1 describes a pH-based regulation method with which it is possible to treat nitrogen in parallel, or simultaneously, by nitritation and deammonification in a sequencing batch reactor. The treatment cycles are characterized by a continuous feed during the reaction phases and by pH-controlled intermittent aeration. The functioning of the intermittent aeration is regulated according to theoretical pH values for which the minimum and maximum variations are 0.02 and 0.05 units.

The drawback of this system lies in the strategy adopted for the effluent feed, which did not prove to be compatible with the stability of the nitrite/ammonium ($N-NO_2$:$N-NH_4$) ratio required for deammonification and the typical reaction rates of AOB bacteria. With a continuous feed, it is difficult to guarantee stabilized operating. This is because the continuous addition of ammonium appears to be incompatible with conversion of the ammonium at a level of 50% during the aeration phase, and the maintaining of a stable $N-NO_2$:$N-NH_4$ ratio throughout the nonaeration phase. This is reinforced by the fact that the narrow pH range set for regulating the duration of introduction or of interruption of air will substantially lead to irregular aeration and anoxic stages which potentially may result in considerable dysfunction during the treatment.

SUMMARY OF THE INVENTION

In order to overcome these drawbacks, and so as to improve the solution described in FR 2 889 180 A1, the present invention proposes to treat the effluents containing ammonium by nitritation and deammonification in a fractionated-cycle sequencing batch reactor in which the reaction phases in aerated and nonaerated medium have a limited duration and are regulated according to at least the conductivity measured in the batch reactor, and preferably also to the dissolved oxygen concentration measured in the reactor.

According to the invention, the method for the treatment of effluents containing nitrogen in the form of ammonium, using a sequencing batch reactor, according to which method:

a volume of effluent to be treated in a complete cycle is introduced into the batch reactor in successive volume fractions, each volume fraction being treated during a subcycle, the successive introduction of the volume fractions making it possible to exert a bacterial selection pressure favorable to the development and to the activity of nitriting bacteria by means of ammoniacal single-shots, each subcycle comprises a phase of feeding with a volume fraction and, in an alternating manner, two treatment stages, i.e.:

an aerated first stage, during which complete or partial oxidation of the ammonium so as to give nitrites takes place, followed by a nonaerated second stage, under anoxic conditions, during which the nitrites produced and the ammonium are converted to nitrogen gas, is characterized in that:

during the aerated first stage, the dissolved oxygen concentration in the batch reactor is maintained between 0.1 $mgO_2/l$ and 0.6 $mgO_2/l$, the $N-NO_2$:$N-NH_4$ ratio is adjusted so as to be between 0.9 and 1.5 at the beginning of the nonaerated second stage, and the nonaerated stage is carried out by deammonification, without the provision of a carbon-based substrate.

Preferably, the aerated first stage is regulated according to at least the conductivity (X) measured in the batch reactor. Advantageously, the aerated first stage is regulated according to, in addition, the dissolved oxygen concentration measured in the batch reactor.

During the aerated first stage, the dissolved oxygen concentration can be maintained between two threshold values by interrupting or turning on the air supply in the batch reactor.

The duration of the aerated first stage is advantageously controlled by measuring the conductivity (X) in the batch reactor, and the air supply is interrupted if a conductivity threshold value (upper limit) is reached before a set period of time.

According to a first procedure, in the aerated first stage, only part of the ammonium stream provided by a volume of effluent to be treated is converted to nitrites, the remaining part of the ammonium stream being sufficient for, in the nonaerated second stage, the nitrites produced and the ammonium not oxidized during the first stage to be converted to nitrogen gas.

The part of the ammonium stream converted to nitrites at the end of the aerated first stage is between 40% and 60% of the stream provided.

According to a second procedure, during the aerated first stage, the ammonium stream provided by a volume of effluent to be treated is completely oxidized so as to give nitrites, and at the beginning of the nonaerated second stage, an additional provision of effluent to be treated, containing ammonium, is carried out in proportion to the stream of nitrites produced in the aerated first stage such that the $N-NO_2$:$N-NH_4$ ratio is between 0.9 and 1.5.

The additional provision of ammoniacal effluent can be carried out in a proportion substantially equal to the stream of the nitrites produced, such that the $N-NO_2$:$N-NH_4$ ratio is substantially equal to 1.

The additional provision of ammoniacal effluent to be introduced at the beginning of the nonaerated second stage is advantageously determined by taking into account an ammonium oxidation yield of between 75% and 98% and an $N-NO_2$:$N-NH_4$ ratio to be maintained for deammonification, of between 0.9 and 1.5.

The additional provision of effluent to be introduced at the beginning of the nonaerated second stage may represent between 50% and 110% of the initial effluent volume.

The time for feeding with effluent to be treated generally represents 7% to 10% of the total duration of the treatment cycle.

The number and the duration of the subcycles and of the phases of the subcycles can be adjusted by virtue of a series of real-time measurements of the flow rate, of the dissolved oxygen, of the conductivity and of the pH in the effluent to be treated, in the batch reactor and in the waste.

The number of subcycles is generally between 2 and 8 per cycle.

The duration of a treatment cycle may be between 4 and 8 hours.

The oxygen concentration is measured on-line in the sequencing batch reactor by means of a probe, and is maintained between two set threshold values, and is managed by a computer or controlling device which, in real time, integrates the measurements and makes it possible to interrupt or initiate the air supply in the reactor.

On-line measurements of the ammoniacal concentration and of the conductivity are advantageously taken into account as ammonium conversion indicators.

The N—$NH_4$ concentration in the reactor can be measured indirectly by means of the conductivity and directly by means of a specific ammoniacal probe, and the ammoniacal stream in the effluent to be treated, by means of the conductivity and the flow rate.

Preferably, the method uses the information from various sensors located:

in the effluent to be treated (flow rate Q, conductivity X, temperature T, pH) for determining the load of nitrogen to be treated and the number of treatment sequences to be carried out, in the sequencing batch reactor (dissolved oxygen $O_2$, conductivity X, temperature T, pH and ammoniacal concentration) for controlling the course of the biological process during the aeration and nonaeration phases and determining the duration thereof, in the waste water (conductivity X, flow rate Q) for determining the treatment yield and retroactively adjusting the method, these sensors being connected to a computer or controlling device which integrates the measurements in real time and thus allows the treatment cycles to proceed in automatic mode.

The invention also relates to a plant for the treatment of effluents containing ammonium, for the implementation of a method as defined above, which comprises a sequencing batch reactor and a collection of equipment associated with the reactor, comprising:

a device for feeding the batch reactor with effluent, in successive volume fractions, aeration means placed at the bottom of the reactor and connected to a pressurized air source, at least one mechanical stirring means, in the reactor, a system for evacuating treated water from the reactor, a system for extracting excess sludge, and various sensors located in the effluent to be treated in order to determine the load of nitrogen to be treated and the number of treatment sequences to be carried out, and is characterized in that it comprises at least one sensor for the conductivity (X) and one sensor for the dissolved oxygen $O_2$, which are provided in the sequencing batch reactor in order to control the course of the biological process during the aeration and nonaeration phases and to determine the duration thereof, the sensors being connected to a computer or controlling device which integrates the measurements in real time and thus allows the treatment cycles to proceed in automatic mode.

Advantageously, the plant comprises, in the waste water, at least one sensor for the conductivity (X) and one sensor for the flow rate, in order to determine the treatment yield and to retroactively adjust the method.

The invention comprises, apart from the arrangements disclosed above, a certain number of other arrangements of which mention will more explicitly be made hereinafter with regard to exemplary embodiments described with reference to the attached drawings, but which are in no way limiting.

DETAILED DESCRIPTION OF THE INVENTION

Figure 1:
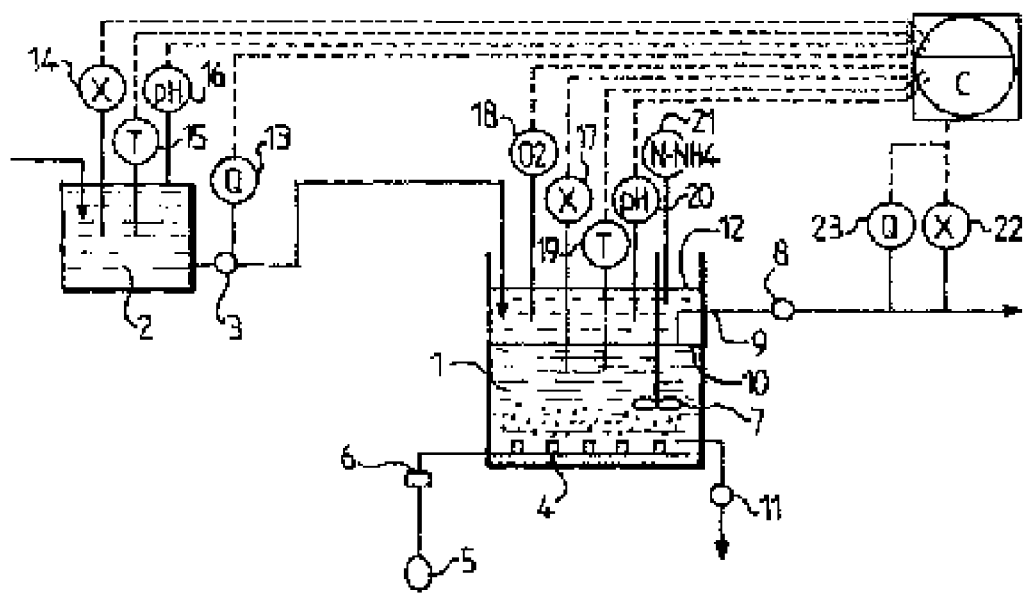
FIG. 1 is a schematic vertical section of a plant in accordance with the invention with a sequencing batch reactor.

With reference to FIG. 1 of the drawings, it can be seen that the plant for the treatment of ammonium by nitritation and deammonification comprises a sequencing batch reactor 1, in the form of a tank, with, upstream, a buffer tank 2 in which the effluent to be treated is stored, if necessary.

The plant also comprises a collection of equipment, associated with the reactor 1 and with the tank 2, described hereinafter:

a device 3 for feeding the batch reactor with effluent, in particular in the form of a pump, the suction side of which is connected to the lower part of the tank 2 and the discharge of which flows into a pipe that runs into the reactor 1;

aeration means 4, in particular formed by nozzles, placed at the bottom of the reactor 1 and connected to a pressurized air source 5 by means of a solenoid valve 6;

at least one mechanical stirring means 7, in the reactor 1;

a system for evacuating treated water from the reactor 1, constituted in particular of a pump 8 and of a pipe 9 forming a dip tube that goes down to a level 10 in the reactor 1;

and a system for extracting excess sludge, if necessary, by means of a pump 11, the suction side of which is connected to the lower part of the reactor 1 and the discharge of which flows into a waste pipe.

In the reactor 1, the fractions of effluent to be treated are successively delivered by means of the device 3. They add to the batch volume of the reactor defined by the minimum level 10 until a maximum level 12 is reached. The hydraulic volume accepted during a treatment cycle determines the maximum capacity of the reactor; this volume is between the minimum level 10 and the maximum level 12.

After various treatment sequences (subcycles) and a settling stage have been carried out, the treated water is drained off, by means of the dedicated evacuation system, from the level 12 to the level 10. The excess sludge produced is evacuated, if necessary, at the end of the treatment cycle by means of the dedicated system 8 and 9.

The method uses the information from various sensors located:

in the effluent to be treated: sensor 13 for the flow rate Q; sensor 14 for the conductivity X; sensor 15 for the temperature T; sensor 16 for the pH, in order to determine the load of nitrogen to be treated and the number of treatment sequences to be carried out, in the sequencing batch reactor: sensor 17 for the conductivity X; sensor 18 for the dissolved oxygen $O_2$; sensor 19 for the temperature T; sensor 20 for the pH and sensor 21 for the ammoniacal concentration, in order to control the course of the batch process during the aeration and nonaeration phases and to determine the duration thereof, in the waste water: sensor 22 for the conductivity X; sensor 23 for the flow rate Q, for determining the treatment yield and retroactively adjusting the method.

These sensors are connected to a computer or controlling device C which integrates the measurements in real time and thus allows the treatment cycles to proceed in automatic mode.

As disclosed previously, the deammonification reaction uses specific, slow-growing bacteria and requires particular conditions in order to take place. Thus, the preliminary nitritation stage is important for maintaining the deammonification treatment since it determines the proportion of two substrates of the reaction, the ammonium and the nitrites.

The invention proposes a system combining a batch reactor 1 capable of maintaining the biomass in order to limit as much as possible the activity losses owing to leaching of the sludge, and a robust management system for making the treatment reliable.

Figure 2:
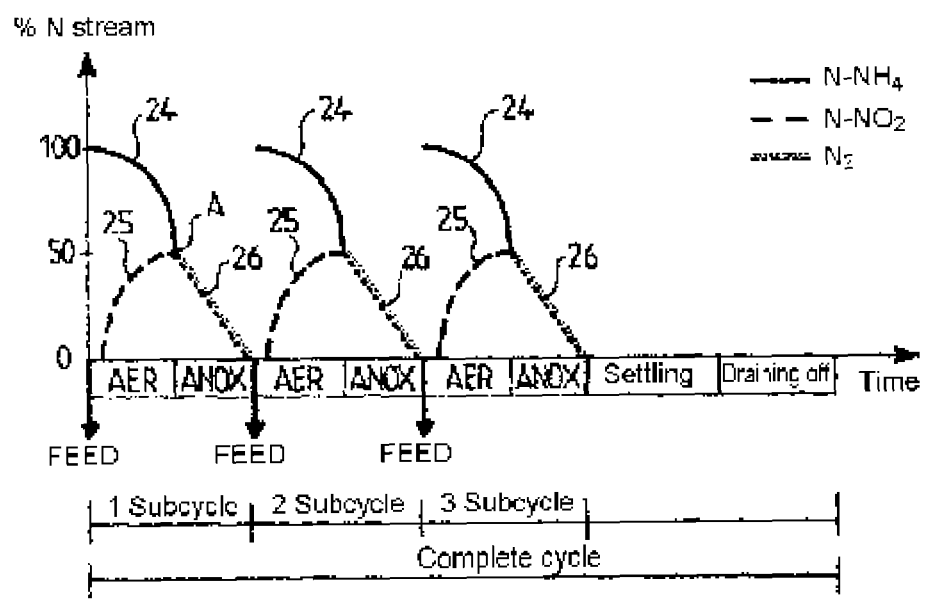
FIG. 2 is a diagram illustrating the variations in N—$NO_2$, N—$NH_4$ and N—$NO_3$ concentrations in the batch reactor as a function of time, according to a first procedure.
Figure 6:
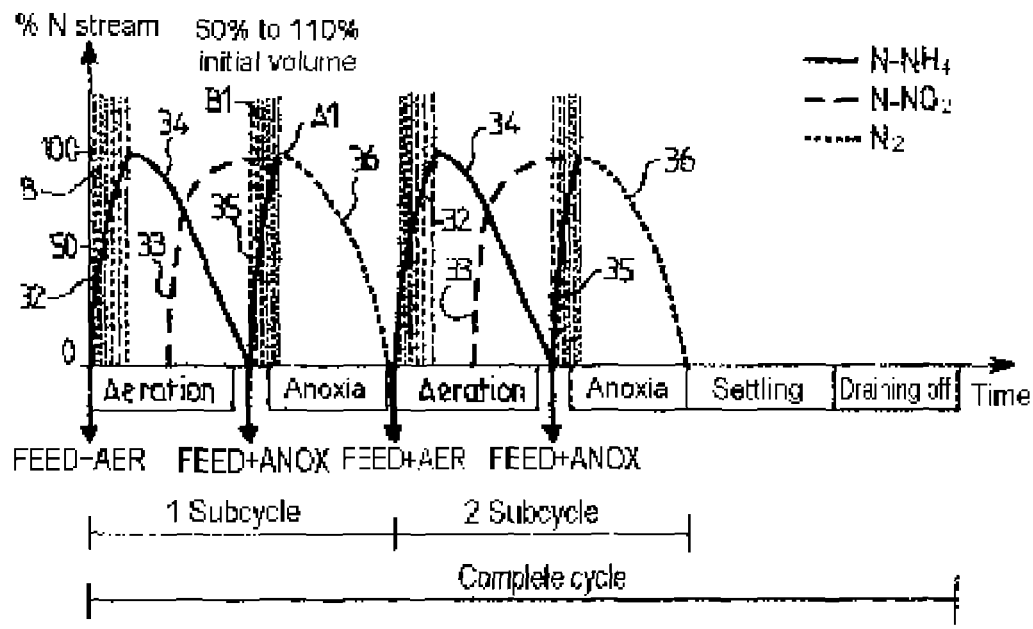
FIG. 6 is a diagram, similar to that of FIG. 2, illustrating the variations in N—$NO_2$, N—$NH_4$ and N—$NO_3$ concentrations in the batch reactor as a function of time, according to a second procedure.

According to the invention, the treatment of the ammonium carried out in the sequencing batch reactor 1 is performed according to a treatment cycle (FIGS. 2 and 6) divided up into several feed/aeration/anoxia subcycles. In FIGS. 2 and 6 of the drawings, the phases of each subcycle are identified by full indications or abbreviations: FEED, AER (for aeration), ANOX (for anoxia). The number and the duration of the subcycles are adjusted by virtue of a series of real-time measurements (conductivity, dissolved oxygen, flow rate, pH) in the effluent to be treated, in the reactor and in the waste. The number of subcycles commonly varies between 2 and 8 per cycle.

Each cycle ends with a settling phase, followed by a draining-off phase.

This management makes it possible in particular to avoid phenomena of inhibition of the anammox bacteria that would be due to a high concentration of nitrites, while at the same time making it possible to establish conditions for stably maintaining the ($N-NO_2:N-NH_4$) ratio.

The volume of effluent to be treated in a treatment cycle, the duration of which is between 4 and 8 hours, is poured into the reactor containing the purifying biomass in successive volume fractions so as to exert a selection pressure favorable to the development and to the activity of nitriting bacteria. The volume of effluent introduced is determined according to the load to be treated, calculated as a function of the flow rate Q and of the conductivity X of the effluent. The time for feeding with effluent to be treated represents only 7% to 10% of the total duration of the treatment cycle.

First Procedure

According to a first procedure, the treatment takes place in the following way.

During the aerated first stage of a subcycle, during which the oxidation so as to give nitrites takes place, only part of the ammonium stream provided by a volume of effluent to be treated is oxidized so as to give nitrites.

The proposed management makes it possible to achieve and keep stable during this aerated stage the nitrite/ammonium ratio necessary for deammonification. This management is illustrated in FIG. 2, where the y-axis is graduated as percentage of N.

The solid-line curves 24 represent the variation in $N-NH_4$ concentration, while the dashed-line curves 25 represent the variation in $N-NO_2$ concentration. At the time of the introduction of a volume fraction into the reactor, the concentration of nitrogen N is 100% due to the ammonium, such that the curve 24 begins at the graduation 100 at the end of the feed phase (FEED) which is carried out with aeration. The curve 24 is a decreasing curve.

The curve 25, corresponding to the proportion of N due to the nitrites $NO_2$, begins a few moments after the start of the aeration, and is an increasing curve. The two curves 24 and 25 cross, at the end of the aeration phase, at a point A for which the y-axis corresponds to an $N-NO_2:N-NH_4$ ratio of between 0.9 and 1.5. According to the scheme of FIG. 2, the point A lies approximately at 50%, i.e. at an $N-NO_2:N-NH_4$ ratio of about 1.

The aeration is then stopped, and the nonaerated second stage, under anoxic conditions, begins during which stage the ammonium is oxidized using the nitrites as electron acceptors, so as to give nitrogen gas. The curve 26, which is substantially rectilinear, illustrates the decrease in the nitrogen concentration in the reactor 1 during the anoxic phase, the concentration becoming zero or being close to the value zero, at the end of the anoxic phase.

The first subcycle is then finished and a second subcycle can begin by feeding with a new volume fraction.

The number of subcycles can vary between two and eight per cycle. In the example of FIG. 2, three subcycles are envisioned.

Figure 3:
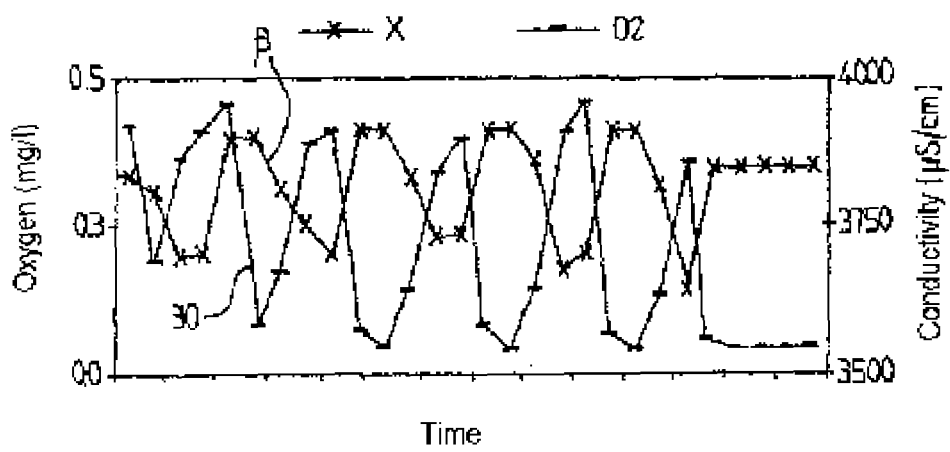
FIG. 3 is a diagram illustrating the variations in dissolved oxygen concentration and in conductivity as a function of time plotted on the x-axis.

FIG. 3 is a diagram illustrating, as a function of time plotted on the x-axis, the variations in dissolved oxygen concentration according to a curve 30, and the variations in conductivity according to a curve β. The conductivity is proportional to the sum of the ionic nitrogen-based forms (ammonium, nitrites and nitrates); it increases as the oxidation state of the nitrogen compounds increases. The conductivity varies in the opposite direction to the dissolved oxygen concentration, and constitutes a parameter which makes it possible to correctly follow and manage the treatment.

Figure 4:
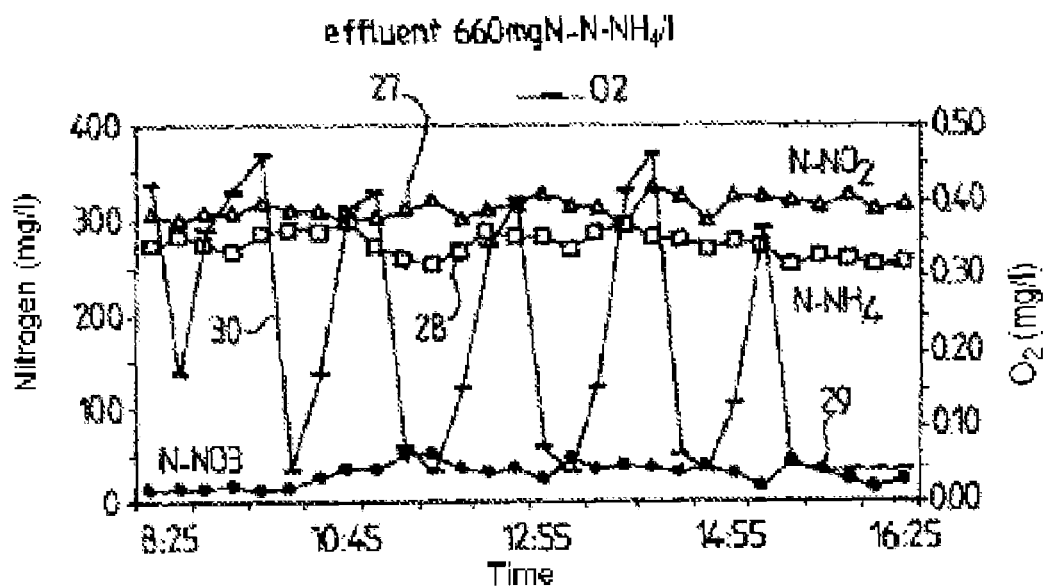
FIG. 4 is a diagram illustrating the variations in N—$NO_2$, N—$NH_4$ and N—$NO_3$ concentrations and in dissolved oxygen concentration, in the batch reactor, as a function of time plotted on the x-axis.

FIG. 4 is a diagram illustrating the partial oxidation of ammonium so as to give nitrites during the aerated first stage or nitritation stage, by control of the dissolved oxygen. The example illustrated corresponds to an average effluent concentration of 660 mg N—$NH_4$/l. The time is plotted on the x-axis. On the y-axis, the left-hand scale gives the nitrogen content expressed in mg/l while the right-hand scale gives the dissolved oxygen content $O_2$ (expressed in mg/l). The curve 27 illustrates the change in N—$NO_2$ concentration, which remains about 300 mg/l. The curve 28 represents the change in N—$NH_4$ content, which remains between 250 and 300 mg/l. The curve 29 illustrates the change in N—$NO_3$, the concentration of which remains low, less than 50 mg/l, which shows that the oxidation so as to give nitrates is virtually nonexistent.

The curve 30 illustrates the variations in dissolved oxygen concentration. The increasing parts of this curve correspond to the aeration phases and the descending parts to the anoxic phases.

Figure 5:
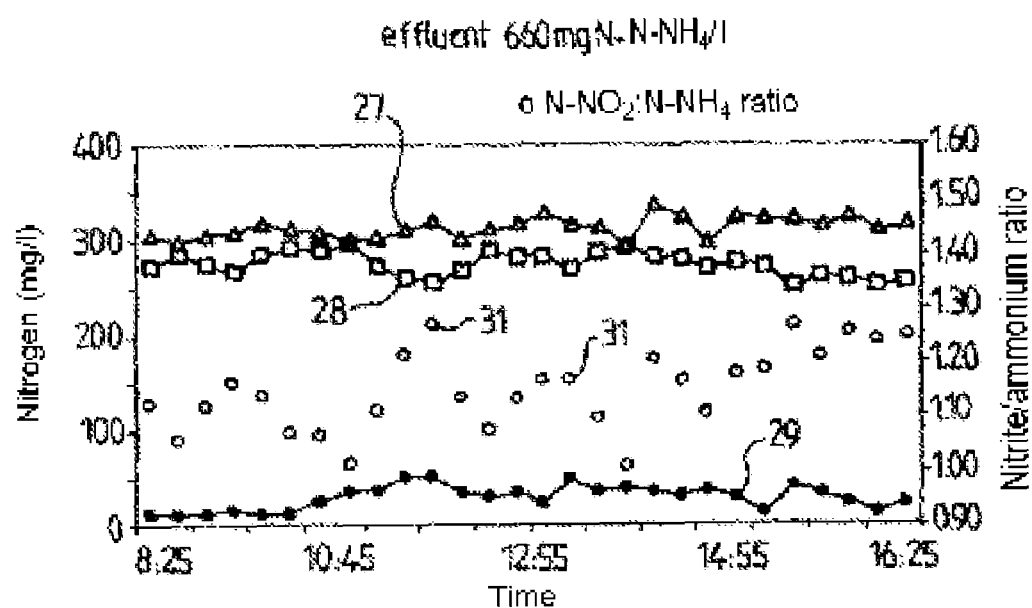
FIG. 5 is a diagram, similar to that of FIG. 4, illustrating the variations in N—$NO_2$, N—$NH_4$ and N—$NO_3$ concentrations as a function of time, and in the nitrite/ammonium ratio in the batch reactor as a function of time.

FIG. 5 is a diagram similar to FIG. 4, with the time on the x-axis and the nitrogen content, expressed in mg/l, on the y-axis on the left. The curves 27, 28 and 29 of FIG. 4 are again found. N-nitrite/N-ammonium (N—$NO_2$:N—$NH_4$) ratio values are plotted on the y-axis on the right. The points of measurement of the N-nitrite/N-ammonium ratio are denoted by the reference 31 and are between 1 and 1.3.

During each subcycle, the oxidation of the ammoniacal stream provided by the volume of water poured into the reactor is controlled by low dissolved oxygen concentrations (between 0.1 mg$O_2$/l and 0.6 mg $O_2$/l), which makes it possible to oxidize, so as to give nitrites, only between 40% and 60% of the ammonium provided (FIG. 2).

The oxygen concentration, measured on-line in the sequencing batch reactor 1 by means of the probe 18, is maintained between two set threshold values, and is managed by the computer or controlling device C which, in real time, integrates the measurements and makes it possible to interrupt or initiate the air supply in the reactor, by closing or opening the valve 6. On-line measurements of the ammoniacal concentration and of the conductivity are taken into account as ammonium conversion indicators.

The conversion of the ammonium and of the nitrites produced, so as to give nitrogen gas, is carried out under conditions of strict anoxia in the second treatment stage. The duration of the anoxic stage is controlled by the on-line measurement of the conductivity X (which gradually decreases) in the sequencing batch reactor 1, by means of the specific probe 17. The anoxic stage is stopped before the initially anticipated period of time, as a function of the nitrogen-based load and of the nitrogen elimination yield, if the lower threshold value for conductivity controlled by the computer C is reached. The concentration of sludge in the sequencing batch reactor will be between 2 g/l and 12 g/l and the sludge age will be between 4 and 35 days.

Second Procedure

A second possible procedure is now considered.

During the aerated first stage of nitritation, the ammonium stream provided by the volume of effluent is completely oxidized so as to give nitrites.

At the end of the aerated first stage, and at the beginning of the nonaerated second stage, a further provision of ammoniacal effluent is carried out in a proportion equal to the stream of nitrites produced in the aerated first stage. With a stabilized nitrite:ammonium (N—$NO_2$:N—$NH_4$) ratio, the ammonium and the nitrites are converted to nitrogen gas under conditions of strict anoxia during the nonaerated second stage.

The dissolved oxygen concentration in the batch reactor is maintained between 0.1 mg$O_2$/l and 0.6 mg$O_2$/l during the aeration stage. The duration of this stage is controlled by the on-line measurement of the conductivity X by means of the specific probe 17, which makes it possible to integrate the measurement and to interrupt the air supply if an upper threshold value for conductivity (reflecting a high oxidation state of the nitrogen compounds) is reached before the set period of time.

The volume fractions of effluent to be introduced in nonaerated medium are calculated taking into account an ammonium oxidation yield of between 75% and 98% and an N—$NO_2$:N—$NH_4$ ratio to be maintained for the deammonification, of between 0.9 and 1.5. They represent between 50% and 110% of the initial effluent volume.

The N—$NH_4$ concentration in the reactor is measured indirectly by means of the conductivity X, by virtue of the probe 17, and directly by means of the specific ammoniacal probe 21. The ammoniacal stream in the effluent to be treated is determined by means of the conductivity X, by virtue of the probe 14, and by means of the flow rate Q, by virtue of the sensor 13.

FIG. 6 illustrates, similarly to FIG. 2, a treatment cycle for nitrogen elimination by nitritation and deammonification, according to the second procedure. The ammonium stream provided is completely oxidized so as to give nitrites during the aerated first stage.

A subcycle comprises a first phase (feed+aeration), represented by a zone B, during which a volume fraction of the stream to be treated is introduced into the reactor. The ascending solid-line curve 32 reflects this provision of $NH_4$ up to the 100% percentage, before the oxidation so as to give nitrites begins, illustrated by the dashed-line curve 33.

The ammonium stream is completely oxidized so as to give nitrites during the aeration phase, such that the N—$NH_4$ content decreases, according to the solid-line curve 34, to a value zero or substantially zero at the end of the aeration phase. At the same time, the curve representing the proportion of N—$NO_2$ reaches substantially the 100% value at the end of the aeration phase.

At the end of this aeration phase, and at the beginning of the nonaerated second phase under anoxic conditions, an additional provision of ammoniacal effluent in zone B1 of the diagram is carried out in a proportion equal to the stream of nitrites produced. This provision is illustrated by the solid-line curve 35 which joins the top of the curve 33 at point A1. The additional provision of ammoniacal effluent in zone B1 is between 50% and 110% of the initial volume of the volume fraction B according to the desired (N—$NO_2$:N—$NH_4$) ratio (preferably between 0.5 and 1.9).

The provision of ammoniacal stream illustrated by the curve 35 is determined on the basis of the various measurements carried out in the plant such that, at the end of this additional provision, the nitrite:ammonium (N—$NO_2$:N—$NH_4$) ratio is equal to 1 or about 1.

During the anoxic next phase, the nitrogen concentration, owing to the oxidation of the ammonium using the nitrites, decreases until it becomes zero, as illustrated by the dotted-line curve 36.

The subcycle ends when the curve 36 reaches the x-axis. A second subcycle is triggered by the introduction of a new volume fraction and the starting up of the aeration.

The complete effluent treatment cycle comprises at least two subcycles and preferably less than eight subcycles. According to the example of FIG. 6, three subcycles are envisioned.

Figure 7:
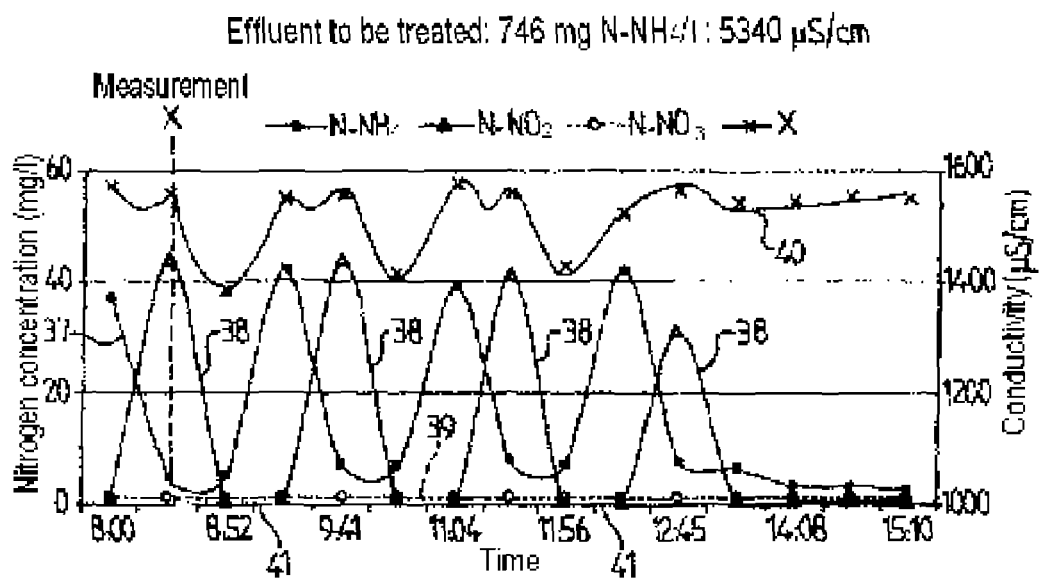
FIG. 7 is a diagram illustrating the variations in N—$NO_2$, N—$NH_4$ and N—$NO_3$ concentrations, and also the variations in conductivity, in the batch reactor as a function of time, according to the second procedure.

FIG. 7 is a diagram illustrating the management of the aeration phases by measuring conductivity during nitrogen treatment by nitritation and deammonification in a sequencing batch reactor 1. The time, expressed in hours and minutes, is plotted on the x-axis, while the nitrogen concentrations expressed in mg/l are plotted on the y-axis on the left and the conductivity expressed in microsiemens/cm (µS/cm) is plotted on the y-axis on the right. The diagram of FIG. 7 corresponds to an effluent to be treated containing 746 mg N—$NH_4$/l and having a conductivity of 5340 µS/cm.

The curve 37 illustrates the variations in N—$NH_4$ concentration. The succession of curves 38 illustrates the variations in N—$NO_2$ concentration. The curve 39 illustrates the variations in N—$NO_3$ concentration and reveals that the presence of nitrates is negligible. The curve 40 illustrates the variations in conductivity measured at various instants for which N—$NH_4$ and N—$NO_2$ are also measured; the measurement results appear in the form of points located on the same vertical.

Each curve 38 comprises a left-hand ascending part, which corresponds to the aeration phase and to the curve 33 of FIG. 6, illustrating the oxidation of the ammonium so as to give nitrites. The N—$NH_4$ concentration decreases, which corresponds to the descending part of the curve 37. The conductivity curve 40 passes through a relative maximum corresponding to the maximum of the curve 38. In general, the conductivity reflects the oxidation state of the ammonium, the conductivity increasing or decreasing according to whether the oxidation state increases or decreases.

The right-hand descending part of each curve 38 corresponds to the anoxic phase and to the curve 36, with the release of nitrogen gas. The segments 41 of the x-axis separating two curves 38 correspond to the introduction of the additional volume fraction illustrated by the curve 35 in FIG. 6. The extreme parts of the curves 37 and 40 located on the right of the diagram of FIG. 7 correspond to the settling and draining-off phases of FIG. 6.

An example of the results obtained by applying the arrangements of this patent application is given hereinafter.

The reactor operating conditions are described below.

| | |
|---|---|
| Working volume of the reactor | 4.1 m³ |
| Centrate feed phase | 7.5% of the cycle |
| Aeration phase | 32% of the cycle |
| Deammonification phase | 45% of the cycle |
| Average oxygen concentration during aeration | 0.55 mg/l |
| Average ammonium concentration in the effluent to be treated | 410 mg/l |
| Average conductivity of the effluent to be treated | 3850 µS/cm |

Figure 8:
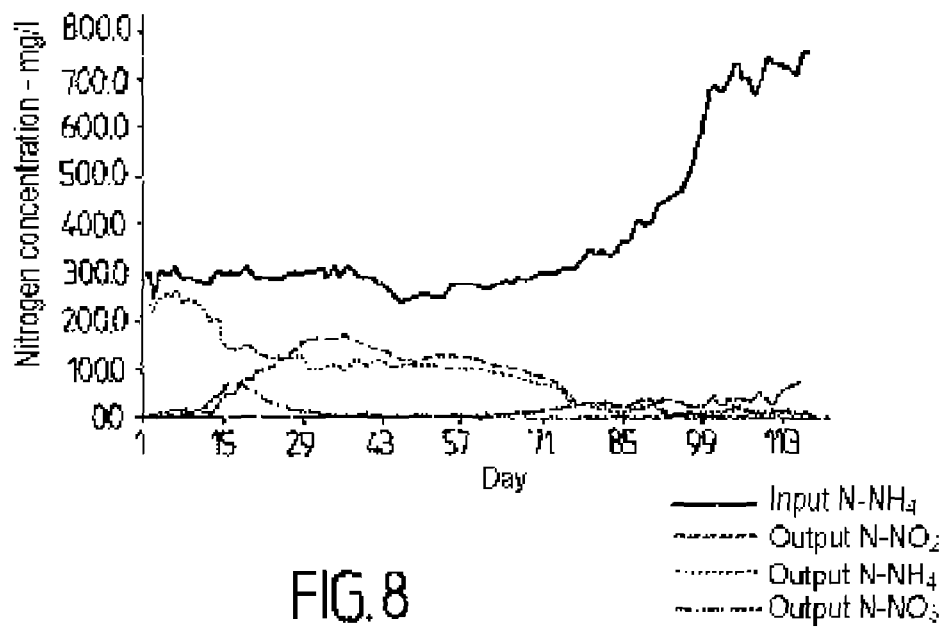
FIG. 8 is a diagram illustrating, for one exemplary embodiment, the variations in nitrogen concentrations in mg/l (input N—$NH_4$, output N—$NO_2$, output N—$NH_4$ and output N—$NO_3$) plotted on the y-axis, as a function of time expressed in days, plotted on the x-axis.
Figure 9:
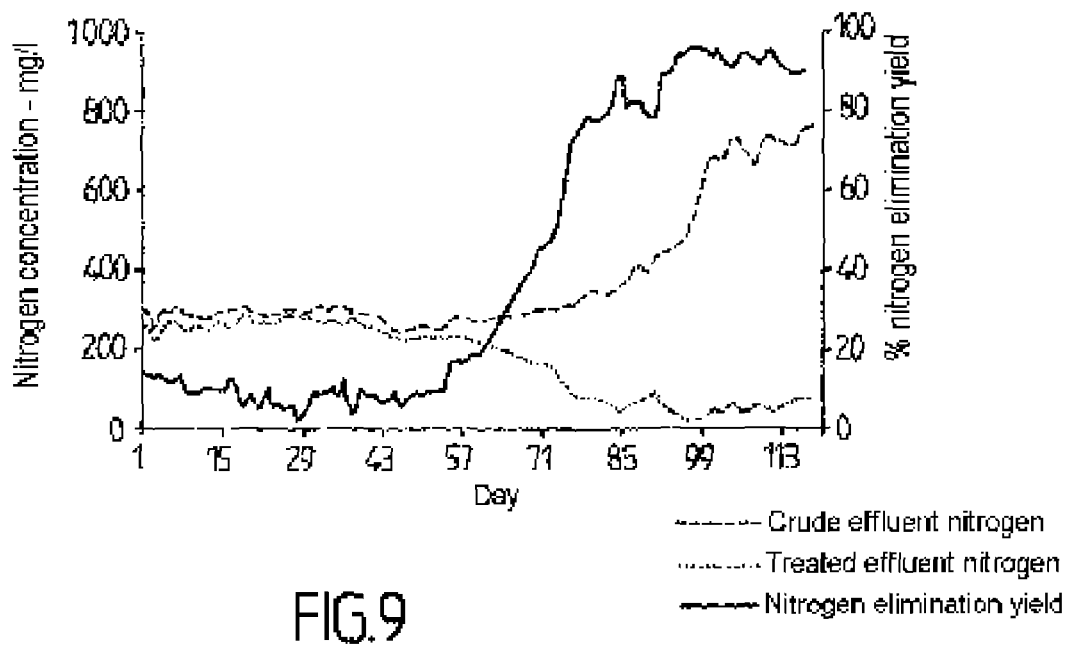
FIG. 9 is a diagram illustrating, for the same example as FIG. 8, the variation in nitrogen concentration (in mg/l) plotted on the y-axis on the left, and in nitrogen elimination yield (as %) plotted on the y-axis on the right, as a function of time expressed in days, plotted on the x-axis.

The results of the application of the method are presented in the form of graphs (diagrams) in FIGS. 8 and 9.

The ammonium concentrations at input and output of the method, and also the nitrite and nitrate concentrations, are shown as a function of time.

At the end of the first month of operation, complete disappearance of the nitrates and the accumulation of nitrites in the reactor output effluent are noted. The $NO_2/NH_4$ ratio is about 1.2 at the end of the aerated phase.

After two and a half months of treatment, the deammonification activity appears and makes it possible to eliminate a part of the nitrites produced. In three months, the deammonification activity makes it possible to treat the entire stream of nitrites produced in the aerated phase. The robustness of the product made it possible, moreover, during this period in which the deammonification activity was established, to increase the concentration of ammonium to be treated from 350 mg/l to 750 mg/l in less than one month (FIG. 8).

The yield for nitrogen elimination by nitrification/deammonification reaches 95% in one and a half months. Nitrates, which are the end products of the deammonification reaction, represent 90% of the nitrogen contained in the effluent treated (FIG. 9).

The conditions described in the patent application make it possible to obtain, in a short period of time (three months), a deammonification yield of 95% without the provision of external biomass, whereas the information available on the prior art [*Startup of reactors for anoxic ammonium oxidation: experiences from the first full-scale anammox reactor in Rotterdam.* W. R. L. van der Star, W. R. Abma, D. Blommers, J-W. Mulder, T. Tokutomi, M. Strous, C. Piciorenu, M. C. M. van Loosdrecht. *Water Research* 41 (2007) 4149-4163.] and [(*Treatment of sludge return liquors: experiences from the operation of full-scale plants*. N. Jardin, D. Thöle, B. Wett.) *Weftec* (2006)] indicates a startup in at least six months with considerable provision of biomass originating from another deammonification reactor (cumulative provision up to 24%).

The invention claimed is:

1. A method for the treatment of effluents containing nitrogen in the form of ammonium, using a sequencing batch reactor (1), according to which:
   a volume of effluent to be treated in a complete cycle is introduced into the batch reactor in successive volume fractions, each volume fraction being treated during a subcycle, the successive introduction of the volume fractions making it possible to exert a bacterial selection pressure favorable to the development and to the activity of nitriting bacteria by means of ammoniacal single-shots,
   each subcycle comprises a phase of feeding with a volume fraction and, in an alternating manner, two treatment stages, i.e.:
     an aerated first stage, during which complete or partial oxidation of the ammonium so as to give nitrites takes place,
     followed by a nonaerated second stage, under anoxic conditions, during which the nitrites produced and the ammonium are converted to nitrogen gas,
   wherein:
     during the aerated first stage, the dissolved oxygen concentration in the batch reactor is maintained between 0.1 $mgO_2$/l and 0.6 $mgO_2$/l,
     the N—$NO_2$:N—$NH_4$ ratio is adjusted so as to be between 0.9 and 1.5 at the beginning of the nonaerated stage,
     and the nonaerated stage is carried out by deammonification, without the provision of a carbon-based substrate.

2. The method as claimed in claim 1, wherein the aerated first stage is regulated according to at least the conductivity (X) measured in the batch reactor.

3. The method as claimed in claim 2, wherein the aerated first stage is regulated according to, in addition, the dissolved oxygen concentration measured in the batch reactor.

4. The method as claimed in claim 1, wherein, during the aerated first stage, the dissolved oxygen concentration is maintained between two threshold values by interrupting or turning on the air supply in the batch reactor.

5. The method as claimed in claim 1, wherein the duration of the aerated first stage is controlled by measuring the conductivity (X) in the batch reactor, and the air supply is interrupted if a conductivity threshold value (upper limit) is reached before a set period of time.

6. The method as claimed in claim 1, wherein, in the first stage, only part of the ammonium stream provided by a volume of effluent to be treated is converted to nitrites, the remaining part of the ammonium stream being sufficient for, in the nonaerated second stage, the nitrites produced and the ammonium not oxidized during the first stage to be converted to nitrogen gas.

7. The method as claimed in claim 6, wherein the part of the ammonium stream converted to nitrites at the end of the aerated first stage is between 40% and 60% of the stream provided.

8. The method as claimed in claim 1, wherein, during the aerated first stage, the ammonium stream provided by a volume of effluent to be treated is completely oxidized so as to give nitrites, and in that, at the beginning of the nonaerated second stage, an additional provision of effluent to be treated, containing ammonium, is carried out in proportion to the stream of nitrites produced in the aerated first stage such that the $N\text{—}NO_2\text{:}N\text{—}NH_4$ ratio is between 0.9 and 1.5.

9. The method as claimed in claim 8, wherein the additional provision of ammoniacal effluent is carried out in a proportion substantially equal to the stream of nitrites produced, such that the $N\text{—}NO_2\text{:}N\text{—}NH_4$ ratio is substantially equal to 1.

10. The method as claimed in claim 8, wherein the additional provision of ammoniacal effluent to be introduced at the beginning of the nonaerated second stage is determined by taking into account an ammonium oxidation yield of between 75% and 98% and an $N\text{—}NO_2\text{:}N\text{—}NH_4$ ratio to be maintained for the deammonification, of between 0.9 and 1.5.

11. The method as claimed in claim 8, wherein the additional provision of effluent to be introduced at the beginning of the nonaerated second stage represents between 50% and 110% of the initial effluent volume.

12. The method as claimed in claim 1, wherein the time for feeding with effluent to be treated represents 7% to 10% of the total duration of the treatment cycle.

13. The method as claimed in claim 1, wherein the number and the duration of the subcycles and of the phases of the subcycles are adjusted by virtue of a series of real-time measurements of the flow rate, of the dissolved oxygen, of the conductivity and of the pH in the effluent to be treated, in the batch reactor and in the waste.

14. The method as claimed in claim 1, wherein the number of subcycles is between 2 and 8 per cycle.

15. The method as claimed in claim 1, wherein the duration of a treatment cycle is between 4 and 8 hours.

16. The method as claimed in claim 3, wherein the oxygen concentration is measured on-line in the sequencing batch reactor (1) by means of a probe (18), and is maintained between two set threshold values, and is managed by a computer or controlling device (C) which, in real time, integrates the measurements and makes it possible to interrupt or initiate the air supply in the reactor.

17. The method as claimed in claim 16, wherein on-line measurements of the ammoniacal concentration and of the conductivity are taken into account as ammonium conversion indicators.

18. The method as claimed in claim 17, wherein the $N\text{—}NH_4$ concentration in the reactor (1) is measured indirectly by means of the conductivity (X) and directly by means of a specific ammoniacal probe, and the ammoniacal stream in the effluent to be treated, by means of the conductivity (X) and the flow rate (Q).

19. The method as claimed in claim 1, wherein it uses the information from various sensors located:
- in the effluent to be treated (flow rate Q, conductivity X, temperature T, pH) for determining the load of nitrogen to be treated and the number of treatment sequences to be carried out,
- in the sequencing batch reactor (dissolved oxygen $O_2$, conductivity X, temperature T, pH and ammoniacal concentration) for controlling the course of the batch process during the aeration and nonaeration phases and determining the duration thereof,
- in the waste water (conductivity X, flow rate Q) for determining the treatment yield and retroactively adjusting the method, these sensors being connected to a computer or controlling device (C) which integrates the measurements in real time and thus allows the treatment cycles to proceed in automatic mode.

* * * * *